(No Model.)

E. O. LYKSETT & A. G. BRAUN.
TILTING WAGON.

No. 412,223. Patented Oct. 1, 1889.

WITNESSES:
S. S. Grey
Z. F. Wilbur

INVENTORS
Albert G. Braun, Edward O. Lyksett
BY R. H. McDermott
ATTORNEY

UNITED STATES PATENT OFFICE.

EDWARD O. LYKSETT AND ALBERT G. BRAUN, OF DENVER, COLORADO.

TILTING WAGON.

SPECIFICATION forming part of Letters Patent No. 412,223, dated October 1, 1889.

Application filed December 10, 1888. Serial No. 293,147. (No model.)

*To all whom it may concern:*

Be it known that we, EDWARD O. LYKSETT and ALBERT G. BRAUN, citizens of the United States of America, residing at Denver, in the county of Arapahoe and State of Colorado, have invented certain new and useful Improvements in Tilting Wagons, of which the following is a specification, reference being had therein to the accompanying drawings.
Our invention relates to an improved construction and arrangement of a wagon of the class or type wherein the bed may be moved or rolled partly off from the truck to tip and discharge its contents.
Its objects are to so construct and arrange such a wagon that the bed is moved both forward and backward by the action of a windlass and the cord, chain, or cable thereon, the bed being positively held and retained thereby at any desired point relatively to the truck, the front end of the bed being elevated on inclined ways or tracks secured to and projecting from the truck when it is desired to tip the bed, and to produce a tilting wagon of simple, strong construction, readily and positively operated, durable and efficient; to which ends the invention consists in the features, constructions, and combinations more particularly hereinafter described and claimed.

Figure 1:
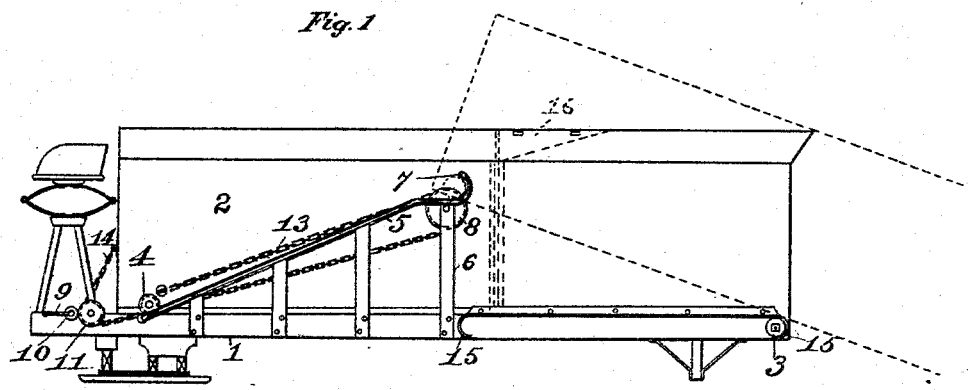
Figure 2:
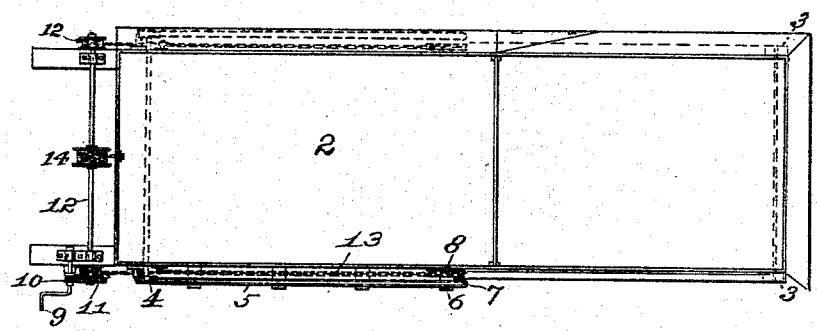
Figure 3:
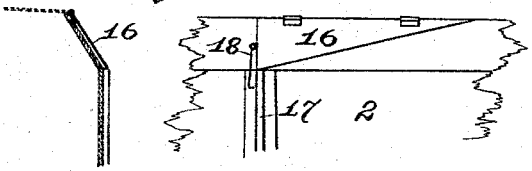

In the drawings is illustrated an embodiment of our invention, wherein Figure 1 is a side view or elevation of our improved wagon; Fig. 2, a top or plan view thereof; Fig. 3, a side view of interior of one side of wagon-bed.

In these figures the reference-numeral 1 indicates the truck of the wagon constructed generally in the usual way and with the proper or requisite number of longitudinal bed plates or sills and of cross-braces and bolsters. On it rests and by it is carried the bed 2.

Upon either side of the truck, at its rear end, are secured the rollers 3, which may be upon one shaft properly journaled in and extending across the truck; or each may have its special independent shaft or axle journaled in bearings on the truck. Such rollers may either be plain or be flanged at one or both edges, the bottom of the bed being provided with suitable ways for taking thereon and rolling thereover.

At the forward end of the bed, and on either side thereof, are the rollers or wheels 4 upon one shaft extending across and journaled in the bed, or each having its own shaft properly journaled, as may be most expedient. These wheels should have grooved peripheries, the better to take on and be guided by the inclined tracks or ways 5, arranged on either side of the truck. Then as the bed is moved to the rear on the wheels 3 the front thereof is elevated by the wheels 4 riding up the inclined ways or tracks.

While such tracks or ways may be constructed in any suitable way, an easy and efficient construction is to form these tracks of round rods secured at their lower and front ends to the truck frame or timbers, and at their rear and elevated ends on standards 6, rising from at or about at the center of the truck-sides. The ends of the ways or tracks should be carried somewhat beyond their points of securement to the standards, and bent upwardly to form the stops 7, receiving the wheels 4 and limiting their rearward movement.

To the standards 6, and at or near their upper ends, are pivoted the pulley 8, one on either side, and over which pass the cords, chains, or cables 13, each secured at one end to the side of the bed and near or at the front lower end thereof, the cable, cord, or chain on one side passing thence over the pulley, and thence to the axle 12, upon which it may be wound and unwound. A crank-handle may be placed directly on the end of the axle 12; but preferably to give greater power or leverage thereon and a correspondingly slower rate of movement thereto, the handle 9 should be upon the spindle of a gear-wheel or pinion 10, meshing with a larger gear-wheel 11 on the axle 12, and having a greater number of teeth than has the small gear 10. Then as the handle is turned in such direction as to wind the chains, cables, or cords upon the axle or shaft 12, the bed will be pulled to the rear thereby over the wheels or rollers 3 and up upon the guideways 5, the cables or chains holding it positively and firmly at any desired point.

In addition to the stops 7, for limiting the movement of the bed upon the ways, additional stops 15 15 may be placed on either side of the bed, forming stops, acting in conjunction with the wheels 3 to limit the movement of the bed in either direction.

The bed having been moved to the rear and tipped by the agency of the cables or chains 13 13, a third cable or chain 14 is used to replace the bed on the truck. At one of its ends this chain is secured to the front end of the bed and at its other end to the axle or shaft 12, and it is wound thereon as the chains or cables 13 are unwound therefrom, and vice versa. Thus the bed is moved in both directions by the windlass and cables or chains and positively held by the latter at any desired point.

As it is often desired to send out several small orders, especially of coal, in one load, at suitable points on the interior of the bed are placed lugs or guideways 17, to keep in place the proper division-boards when they are used. To strengthen such divisions and prevent the contents of one division from flowing over the sides and the division when the bed is tipped, additional pieces 16 are hinged upon the inside of the flare-boards of the sides, as shown in Fig. 3. Such pieces may be rectangular, or may be triangular, as shown, and are hinged to the flare-boards at the upper outer edges thereof. When it is desired to use the division-boards, these auxiliary pieces are turned upward and outwardly and the division-boards put in place. The auxiliary pieces 16 are then turned inward upon the top edges of the division, the latter carrying eyes or equivalent fastening devices, on or in which take the hooks 18, these pieces 16 thus steadying the divisions and forming also a horizontal re-enforcement aiding in retaining the contents of a division.

Any suitable hook or other fastening device may be used at the fronts of the bed and truck to lock the two together, though the arrangement of the chains or cables and the crank-axles always holds the bed positively, especially if a pawl be applied to the axle or one of the wheels in the usual way to positively lock the winding mechanism.

Having thus described our invention, what we claim is—

1. The combination, with a wagon truck and bed, of inclined ways or tracks rising from the front of the truck to or just beyond the longitudinal center thereof, and supported thereat by standards rising therefrom, pulleys journaled at or near the ends of such standards, wheels or rollers at the front base of the bed taking upon the inclined ways or tracks, a wheel and axle journaled upon the front of the truck, chains passing thence over the pulleys to or near to the front end of the bed for moving it to the rear, and a chain or chains passing directly from the wheel and axle to the front of the bed for moving it to the front, substantially as set forth.

2. The combination of the truck 1, the wheels or rollers 3 3, the inclined ways or tracks 5 5, having stop ends 7 7, the bed 2, having rollers or wheels 4 4 and stops 15 15, the wheel and axle, and the connections 13 14, substantially as set forth.

3. The combination, with the sides of the bed, of auxiliary pieces 16, hinged or pivoted to the flare-boards, substantially as set forth.

In testimony whereof we affix our signatures in presence of two witnesses.

EDWARD O. LYKSETT.
ALBERT G. BRAUN.

Witnesses:
  Z. F. WILBER,
  B. L. POLLOCK.